United States Patent
von Hein et al.

(10) Patent No.: US 11,436,646 B2
(45) Date of Patent: *Sep. 6, 2022

(54) INTEGRATION PLUGIN FOR IDENTIFYING AND PRESENTING ASSOCIATED ITEMS ON A WEB PAGE

(71) Applicant: simplesurance GmbH, San Francisco (DE)

(72) Inventors: Robin von Hein, Berlin (DE); Joachim von Bonin, Berlin (DE); Ismail Asci, Berlin (DE); Manuel Kester, Berlin (DE)

(73) Assignee: simplesurance GmbH, Berlin (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/802,420

(22) Filed: Feb. 26, 2020

(65) Prior Publication Data
US 2020/0193488 A1 Jun. 18, 2020

Related U.S. Application Data

(63) Continuation of application No. 15/204,202, filed on Jul. 7, 2016, now Pat. No. 10,580,047.
(Continued)

(51) Int. Cl.
*G06Q 30/00* (2012.01)
*G06Q 30/02* (2012.01)
(Continued)

(52) U.S. Cl.
CPC ....... *G06Q 30/0277* (2013.01); *G06F 16/972* (2019.01); *H04L 67/02* (2013.01)

(58) Field of Classification Search
CPC .... G06Q 30/0277; G06F 16/972; H04L 67/02
See application file for complete search history.

(56) References Cited

U.S. PATENT DOCUMENTS 9,262,771 B1  2/2016  Patel
9,734,503 B1 * 8/2017  Gargi ................. G06Q 30/0631
(Continued)

FOREIGN PATENT DOCUMENTS

CN  101499079  8/2009
CN  101960446  1/2011
(Continued)

OTHER PUBLICATIONS

"Async vs defer attributes", http://www.growingwiththeweb.com/2014/02/async-vs-defer-attributes.html, Feb. 26, 2014, 5 pages.
(Continued)

*Primary Examiner* — Yehdega Retta
(74) *Attorney, Agent, or Firm* — Kilpatrick Townsend & Stockton LLP

(57) ABSTRACT

Embodiments can provide automated matching of items to cart items and generation and rendering of customized template blocks, such that the appearance of the template blocks is adaptive, with remote configuration and optimization at one or more stages of a process. An integration plugin can enable websites to present additional items that are associated with an item displayed on a web page. The integration plugin can be compatible with many websites, be plug-and-play, quickly installed, and not require significant programming effort from the website. Embodiments can provide integration into the web site leading to increased conversion rates. Embodiments can provide information from a first item for additional items without additional data entry. Embodiments can provide real-time performance tracking for monitoring and optimization. Embodiments can provide composite user interfaces to manage item matching, performance tracking, and configuration.

22 Claims, 6 Drawing Sheets

Related U.S. Application Data

(60) Provisional application No. 62/189,671, filed on Jul. 7, 2015.

(51) Int. Cl.
*G06F 16/958* (2019.01)
*H04L 67/02* (2022.01)

(56) References Cited

U.S. PATENT DOCUMENTS

| | | | |
|---|---|---|---|
| 10,580,047 | B2 | 3/2020 | Von Hein et al. |
| 2003/0130897 | A1* | 7/2003 | Pickover ............ G06Q 30/0253 705/7.36 |
| 2007/0255617 | A1 | 11/2007 | Maurone et al. |
| 2009/0234722 | A1 | 9/2009 | Evevsky |
| 2010/0332328 | A1 | 12/2010 | Dharmaji et al. |
| 2012/0079057 | A1 | 3/2012 | Fainberg et al. |
| 2012/0158513 | A1 | 6/2012 | Schoen et al. |
| 2013/0073401 | A1* | 3/2013 | Cook ................ G06F 12/0802 705/14.73 |
| 2014/0207609 | A1* | 7/2014 | Earhart .............. G06Q 30/0631 705/26.7 |
| 2015/0066684 | A1* | 3/2015 | K. V .................... G06F 16/951 705/26.7 |
| 2015/0134781 | A1* | 5/2015 | Silberstein ............. G06F 16/70 709/219 |
| 2017/0011433 | A1 | 1/2017 | Von et al. |

FOREIGN PATENT DOCUMENTS

| | | | |
|---|---|---|---|
| CN | 102067161 | 5/2011 | |
| CN | 102402436 | 4/2012 | |
| CN | 103544008 | 1/2014 | |
| CN | 107851130 | 3/2018 | |
| GB | 2425194 A | * 10/2006 | ......... G06F 17/3089 |
| JP | 2009505239 | 2/2009 | |
| JP | 2010250788 A | 11/2010 | |
| JP | 2011525659 | 9/2011 | |
| JP | 2014085812 | 5/2014 | |
| WO | 2017006287 | 1/2017 | |

OTHER PUBLICATIONS

"Getting Started", https://www.hitchhq.com/api/apis/googl/emaps/activities/5974b78e2e411000b8dd44/, Nov. 10, 2013, 5 pages.
U.S. Appl. No. 15/204,202 , "Final Office Action", dated May 14, 2019, 10 pages.
U.S. Appl. No. 15/204,202 , "Non-Final Office Action", dated May 16, 2018, 7 pages.
U.S. Appl. No. 15/204,202 , "Non-Final Office Action", dated Dec. 21, 2018, 8 pages.
U.S. Appl. No. 15/204,202 , "Notice of Allowance", dated Oct. 25, 2019, 8 pages.
U.S. Appl. No. 15/204,202 , "Supplemental Notice of Allowability", dated Dec. 5, 2019, 2 pages.
JP2018-520048 , "Office Action", dated Apr. 13, 2020, 4 pages.
PCT/IB2016/054100 , "International Search Report and Written Opinion", dated Sep. 28, 2016, 11 pages.
PCT/IB2016/054594 , "International Search Report and Written Opinion", dated Oct. 25, 2016, 13 pages.
JP2018-520048 , "Office Action", dated Oct. 9, 2020, 5 pages.
Application No. CN201680046605.1 , Office Action, dated Apr. 30, 2021, 24 pages.
Application No. JP2018-520048 , Notice of Allowance, dated Apr. 2, 2021, 3 pages.

* cited by examiner

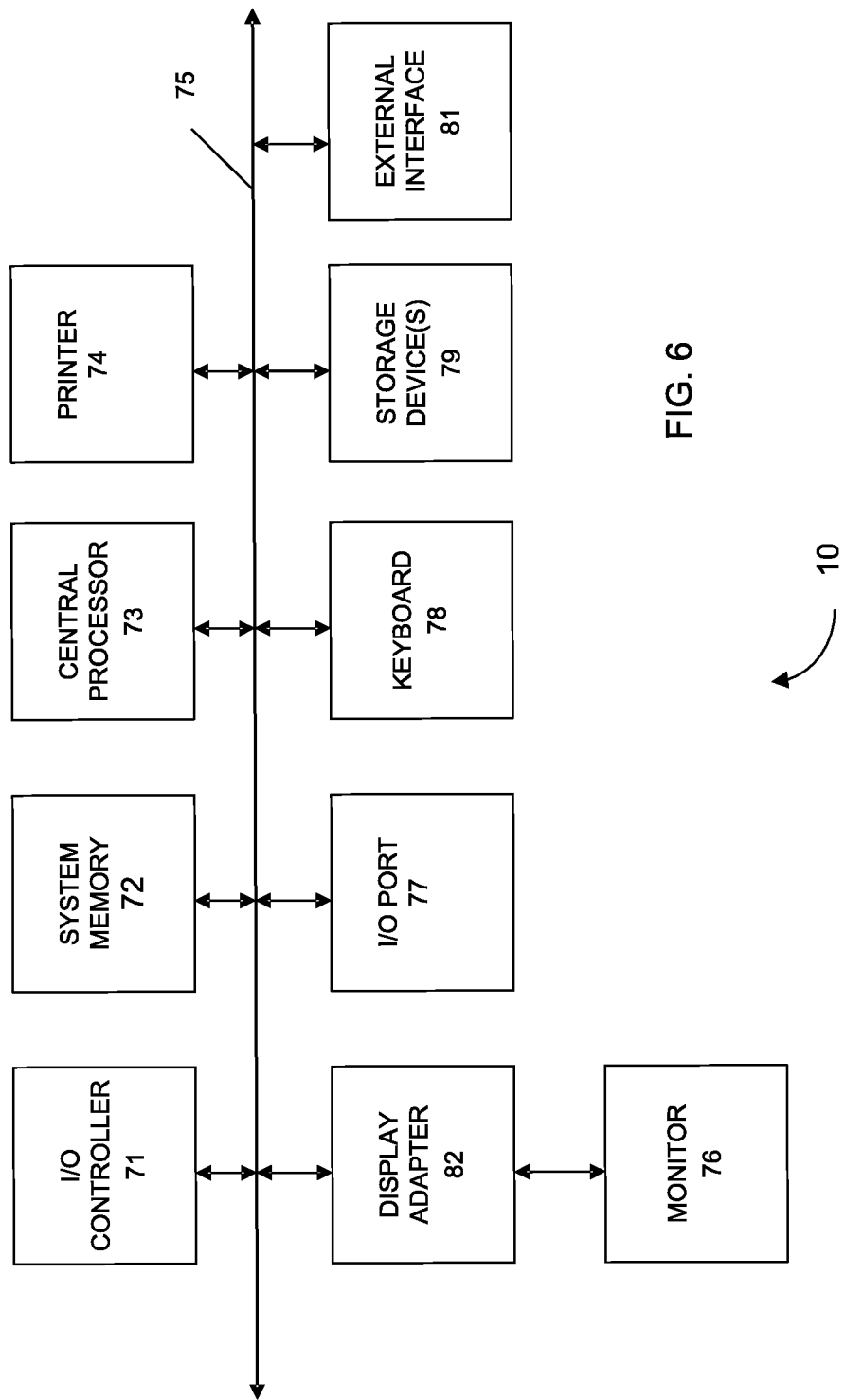

INTEGRATION PLUGIN FOR IDENTIFYING AND PRESENTING ASSOCIATED ITEMS ON A WEB PAGE

CROSS-REFERENCES TO RELATED APPLICATIONS

The present application is a continuation of U.S. Pat. No. 15,204,202, filed Jul. 7, 2016, which claims priority to U.S. Provisional Application No. 62/189,671 by von Hein et al, entitled "Checkout Integration Plugin" filed Jul. 7, 2015, the entire contents of which are herein incorporated by reference for all purposes. This application is also related to U.S. patent application Ser. No. 62/199,762, entitled "Optimizing Website Environments," which is incorporated by reference herein in its entirety for all purposes.

FIELD

Disclosure herein generally relates to providing one or more additional items to a web page that are associated with a base item already on the web page. Specifically, the disclosure relates to enabling a web page to integrate the ability to identify and provide additional items related to a base item already displayed on the web page. In the disclosure herein, an item can be a product or a service sold in an online store.

BACKGROUND

Conventionally, identifying and presenting additional items on a web page, where the additional items are associated with a base item already displayed on the web page is a very time consuming effort. In some cases, a user must locate the additional items on their own. In other cases, the website must correlate an additional item with the base item. In addition, presenting the additional items require the website to reprogram their layout every time the website makes a change. Thus, integration of additional items can require large amounts of programming on the website. Embodiments of the disclosure herein address these and other problems, individually and collectively.

BRIEF SUMMARY

Embodiments herein can provide automatic or semi-automatic presentation of one or more additional items associated with a base item displayed on a web page. For example, a system can generate and render customized template blocks for the web page to display information associated with the one or more additional items. In some examples, the customized template blocks can be configured and optimized remotely.

In some examples, an integration plugin can enable an integration system to include one or more additional items on a web page of a website, where a presentation of the one or more additional items is remotely customized for a user viewing the web page. In some examples, the integration plugin can be compatible with different websites. The integration plugin can also be plug-and-play, allowing installation to be quick and/or seamless. In some examples, the integration plugin can remove a need to extensively program the website to automatically or semi-automatically provide additional items from the website.

Embodiments can also provide remote configuration and optimization of customized template blocks to provide an additional item during an interaction with the website without a need to modify the website. In some examples, there might be no significant programming required for the website to integrate the integration plugin.

Embodiments can also provide integration for one or more steps of a process associated with the website, enabling a combination of a first item and a second item, where the second item is associated with the first item. Embodiments can also provide remote control over where and if a template block should be displayed. Embodiments can also provide different states of the template block, each state reflecting previous actions taken by a user.

Embodiments can also provide a reduction of data needed to be entered for an interaction associated with an additional item. In such embodiments, data from a base item and/or user data (e.g., a name, address, etc.) can be retrieved from the website for the additional item without having to query the user again. Embodiments can also provide real-time performance tracking of template blocks for monitoring and optimization.

Embodiments can also provide composite user interfaces to manage item matching, item configuration, performance tracking, and template block configuration in one place remotely, without any action by the website. Embodiments are also directed to systems, portable or mobile consumer devices, and computer readable media associated with methods described herein.

Other embodiments are directed to systems, portable consumer devices, and computer readable media associated with methods described herein.

A better understanding of the nature and advantages of embodiments of the present invention may be gained with reference to the following detailed description and the accompanying drawings.

BRIEF DESCRIPTION OF THE DRAWINGS

FIG. 6 illustrates an example of a block diagram for a computer system.

DETAILED DESCRIPTION

Figure 1:
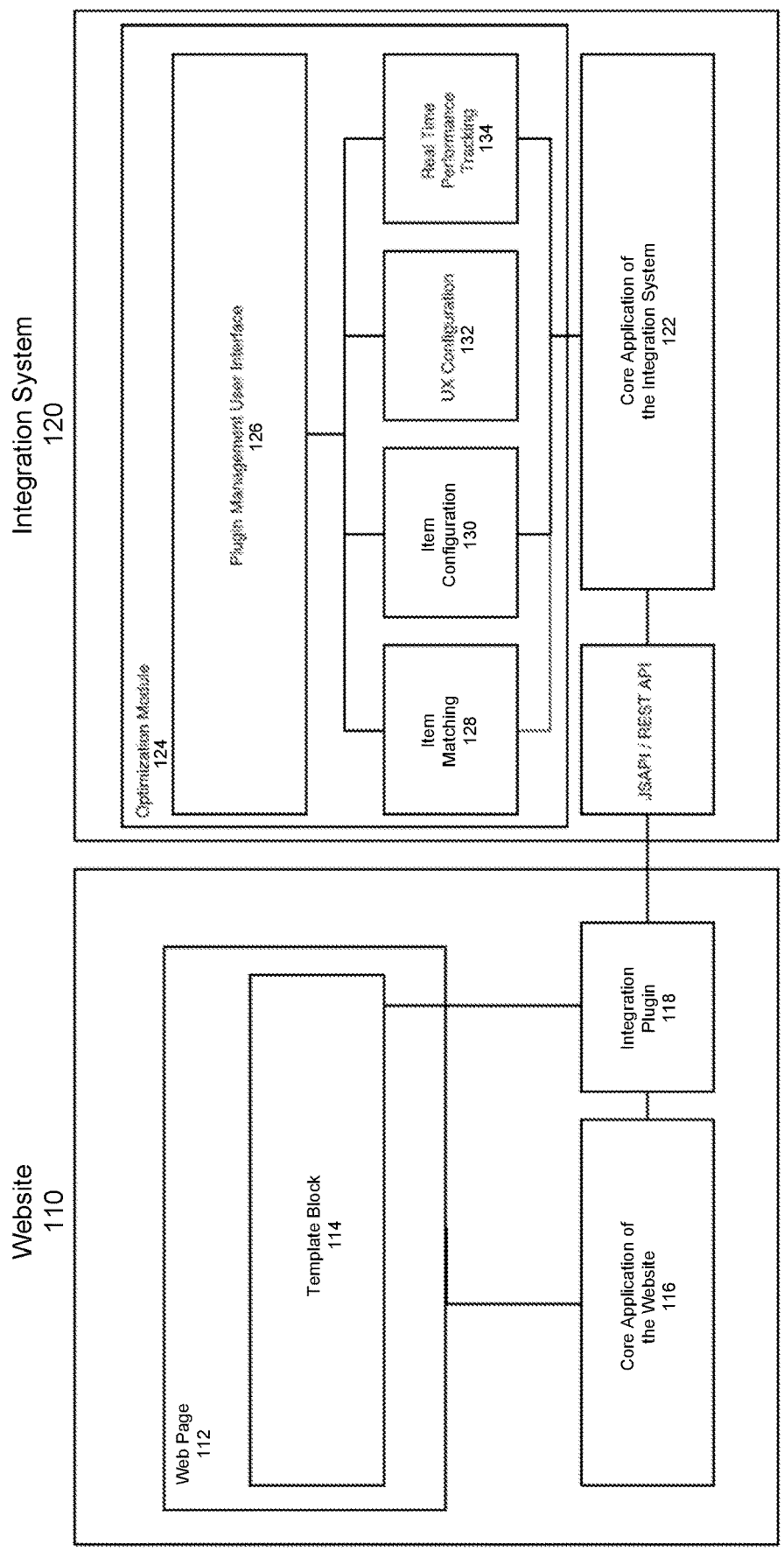
FIG. 1 illustrates an example of a website and an integration system.

An integration plugin can be integrated into a website for a process to provide one or more additional items to a user. The integration plugin can enable automated identification of an additional item associated with a base item already displayed on a web page of the website. The identification can occur using a database that includes one or more items. The integration plugin can also enable generation and rendering of customized template blocks to be displayed on a web page on a client computer. In some examples, the appearance of the customized template blocks can be configured and optimized remotely from the website by an integration system. The integration system can include a core application to communicate with an integration plugin located on a web page that was sent by the website. The integration system can also provide item matching, item configuration, performance tracking, generation of customized template blocks, and other services.

The integration plugin can be integrated into a website and can enable the website to provide one or more additional items associated with a base item displayed on a web page. When a user navigates to a web page received from a website, the integration plugin can automatically load a first script onto the web page. The first script can cause an integration system to match one or more additional items with a base item displayed on the web page (e.g., in a shopping cart). If an additional item is identified by the integration server, the integration plugin can render a customized template block with an identification of the additional item.

The user can add the additional item from the customized template block to a purchase and proceed with a checkout. In cases where an additional item was added, the user can confirm the base item (e.g., the item already displayed on the web page) and the additional item at one time. Information associated with a selection of the additional item can be stored by the client computer when a request is sent for the additional item to the website.

When a success page is sent back from the website, a second integration plugin can cause a second script to be installed that sends information associated with the purchase to a core application of the integration system (e.g., the information can indicate that an additional item was purchased or not). In some examples, the second script can be the same as the first script. The core application of the integration system can store information associated with the purchase to be used for future items displayed on a web page, without involvement of the website.

The template block that presents the additional item can be configured, reconfigured, and optimized at any time without any effort from the website. Through multiple iterations of A/B testing (as will be discussed below), a template block can be optimized in order to increase conversion rates. As discussed in the disclosure herein, an item can include a product or a service.

In some examples, the integration plugin can be widely compatible and easy to install with different websites. In some examples, the integration plugin can be installed in a website in a plug-and-play manner. In some examples, the integration plugin can be installed within a short timeframe (e.g., a few minutes) and might not require significant programming efforts from the website. In one embodiment, there can be no programming effort required at all by the website. Many prior systems have an obstacle that they require a large amount of programming from the website to provide additional items, which can cause information technology (IT) resource bottlenecks for the website.

In some examples, a conversion rate can indicate a performance of an integration system. The conversation rate can be a number of times an additional item is selected with a base item divided by the total number of times the base items is selected.

I. Example Usage of an Integration Plugin

To provide one context that the integration plugin can be used, a buying process on a website will now be described. In one example, an integration plugin can enable a website to cross sell or up sell an item (e.g., product insurances and warranty extensions) with other items (e.g., computers, phones, or any other product or service).

In one illustrative example, the integration plugin can be used in association with offering insurance for electronics, such as smartphones. For example, when a user is purchasing a smartphone, an offer for smartphone insurance can be displayed before the user confirms the purchase of the smartphone. Using the integration plugin, the purchase of the smartphone and the insurance can be a one-click solution, such that with one click the user could attach the smartphone insurance to the shopping basket and then finish the transaction seamlessly, without disturbing the buying process. By not disturbing the buying process, a conversion rate for one or more cross-selling and/or up-selling items for the online shop can improve.

In another illustrative example, a user can buy a bike online and, in the buying process, add theft insurance for the bike. Other examples include, but are not limited to, insurance and warranty extensions for various electronics (e.g., dishwashers, refrigerators, and watches), musical instruments, eyewear, car tires, and anything that can be bought and sold online. Other cross-selling and/or up-selling items can be a TV subscription, buyer protection service, or any other complimentary item.

In some examples, the integration plugin can take advantage of common information used during the buying process. For example, the user might not be asked to enter any additional information when adding on an additional item. The integration plugin can use information already entered by the user, or known by the website. For example, an additional item can require an email address and a unique identifier of an item associated with the additional item. For an electronic device, the unique identifier can be a serial number of the electronic device. If, for example, a user chooses to buy insurance using the integration plugin, the integration plugin can capture the user's email address and the serial number of the smartphone that is being purchased from the website.

In one illustrative example, an optimization module of the integration system can measure, in real time, a number of users buying an item (e.g. a bike) and a number of cross-selling and/or up-selling items sold (e.g., a theft insurance for the bike). Using the number of users and the number of cross-selling and/or up-selling items sold, the optimization module can calculate a conversion rate.

The integration plugin and the optimization module can be used to increase the conversion rate for an additional of the website. In some examples, a presentation of the additional items can adapt based on the conversion rates. The presentation can also depend on items involved, the website, users that typically shop and/or buy from the website, and any other factor associated with possible clients purchasing items. For example, a lower-end shop selling cheaper items can have a completely different target group compared to a premium shop selling more expensive items. The different shops can require different additional items as well as different types of communication or presentation of the additional items.

In some examples, the integration plugin can be used to display an offer with one or more additional items received from the integration system. The offer can be presented with different display characteristics (e.g., message texts, headers, colors, logos, structure, user flow, etc.). In addition, one or more attributes of the additional item can be changed. For example, a length of time insurance lasts can be changed depending on a price point of the insurance. For another example, things covered under the insurance can be changed. By changing the one or more attributes, a price of the cross-selling or up-selling item can be made to fit a budget of a user.

II. Integration System

FIG. 1 illustrates an example of a website 110 and an integration system 120. The website 110 can send one or more web pages to a client computer during an interaction between the client computer and the website. In some examples, a web page 112 of the one or more web pages can include an item (e.g., a base item). The web page 112 can include a template block 114, which can include one or more additional items that are associated with the base item. The website 110 can further include a core application of the website 116 and an integration plugin 118. The core application of the website 116 can provide control and functionality to the website 110. The integration plugin 118 can provide a connection between the website 110 and the integration system 120. In some examples, an Application Programing Interface (API) (e.g., a Representational State Transfer API (REST-API)) can be used to facilitate communication between the website 110 and the integration system 120.

The integration system 120 can determine a format to present an additional item to a user. The format can be in the form of a template block 114. The template block 114 can include information associated with the additional item. To add the template block 114 to the web page 112, the web page 112 can include one or more hooks (e.g., a web hook). The one or more hooks can be located in various portions of the web page 112, to allow the template block 114 to be inserted into the various portions. Using the one or more hooks, the integration plugin 118 can insert the template block 114 into the web page 112. The content of the template block 114 can be sent from one or more servers associated with the integration system 120. By storing data and content remotely, the integration system 120 can allow for rapid and automated changes without needing to modify the website 110.

The integration system 120 can also analyze interactions with the template block 114 (e.g., a user selecting the additional item). The integration system 120 can also include a core application (e.g., a core application of the integration system 122), which can provide control and functionality of the integration system 120.

The integration system can include an optimization module 124, which can identify an additional item, identify how to present the additional item to a user, determine when to display the additional item on a web page, perform optimization of the entire process by analyzing responses of a user to the additional item, or any combination thereof. In some examples, the optimization module 124 can change a presentation and/or content of an additional item in the template block 114 based on how well previous additional items worked with either the same user or different users. In some examples, the optimization module 124 can determine whether a base item displayed on a web page of the website 110 is one for which an additional item should be shown. The determination can occur after the integration plugin 118 is installed, without further definition required by the website 110. In some examples, the optimization module 124 can also identify one or more web pages in a buying process that an additional item should be displayed to a user.

The optimization module 124 can include a plugin management user interface 126. The plugin management user interface 126 can provide a user interface for a user associated with the integration system 120 to interact with the optimization module 124. The optimization module 124 can use at least one or more of an item matching module 128, an item configuration module 130, a user experience (UX) configuration module 132, a real time performance tracking module 134, or any combination thereof.

The item matching module 128 can match a base item on a web page displayed to a user to one or more additional items. The item configuration module 130 can determine one or more attributes of an additional item for a user. The UX configuration module 132 can be used to optimize the presentation of the additional item to the user. The real time performance tracking module 134 can track an interaction with a template block by the user.

The integration plugin 118 can work across different browsers using common technologies (e.g., JavaScript). The integration plugin 118 does not require individual customizing based on a type of the website, allowing for easier display of the template block 114, transfer of user data, and item matching. Additionally, if a user selects an additional item, the integration plugin 118 can send information associated with the additional item to the core application of the integration system 122, which would forward to the real time performance tracking module 134, for tracking purposes.

The integration plugin 118 can also receive information associated with a base item on a web page (e.g., in a shopping cart or selected by a user) from the core application of the website 116. In other examples, the integration plugin 118 can request the information associated with the base item using specific tags and/or specific kind of application program interface (API) calls for the website 110. The integration plugin 118 can then send the information associated with the base item to the integration plugin 118 for analysis by the optimization module 124. Because the information associated with the base item is not normalized across websites, the integration plugin 118 can format the information associated with the base item to a common format used by the optimization module 124. The core application of the integration system 122 can receive the information associated with the base item from the integration plugin 118, and send the information to the optimization module 124 to determine one or more additional items from a database of items.

In some examples, information input by a user during an interaction with a website can be sent to the core application of the integration system 122 from the integration plugin 118. The information input by the user can be used in relation to additional items (e.g., for required information for an insurance or future correspondence). Other information from a user or a web page that can be sent to the core application of the integration system 122 can be stored by the integration system 120.

Once the core application of the integration system 122 identifies a match for a base item to be displayed to a user, an additional item associated with the base item can be selected from the database. The selection can be selected randomly, or by defined rules, such as for certain base items only product insurance with a 12 month period is displayed.

In some examples, the item configuration module 130 can identify one or more attributes of an additional item identified by the item matching module 128 (e.g., cost and terms of an insurance). The item configuration module 130 can then determine how to configure the additional item for a user. The UX configuration module 132 can determine a layout, format, or any combination for the additional item.

The core application of the integration system 122 can respond to the integration plugin 118 with a customized template block and instructions for where to display the customized template block. The instructions can include two or more preconfigured page element identifiers. One of the preconfigured page element identifiers can be a page element to hook the template block 114 onto. The other preconfigured page element identifier can be one or more page elements that can lead to any other page and thereby determine an end of an interaction with a specific page. Using the two or more preconfigured page element identifiers, information associated with an additional item can be displayed in the template block 114 at any stage during an interaction between a user and a website. Thus, even before the user is finishing the interaction, the user can be shown an additional item. The user can select it with one click, adding it to a shopping basket. The user can also confirm a purchase of the additional item.

As described above, the real time performance tracking 134 can provide real-time performance tracking of data including at least one or more of: (1) whether a user completed an interaction with an additional item included, (2) whether the user completed an interaction without the additional item included, (3) whether the user clicked on the additional item, (4) or any combination thereof.

Using the data recited above, the real time performance tracking module 134 can track match rates and/or conversion rates of base items and additional items associated with the website 110. The real time performance tracking module 134 can collect information from the website to measure the conversion rate. For example, a conversion rate of 10% would be present if a shop sells 100 bikes, and for those 100 bikes, 10 product insurances are purchased. The completed information can be used with monitoring and optimization of conversion rates.

The real time performance tracking module 134 can also track the number of uncompleted sales for the website 110 and how many times an additional item was displayed and what the rejection rate was for the additional item. The rejection rate can, for example, indicate when a potential user begins an interaction with a website, but the user never gets to the end of the interaction to actually finish the interaction.

Additionally, there can be several optimization cycles in order to maximize conversion rates. The real time performance tracking 134 can track impressions of users, meaning that it can track each time a user is progressing through an interaction with a website. For example, real time performance tracking 134 can track each time a template block is displayed. The real time performance tracking 134 can determine whether to display an additional item (e.g., whether the additional item is insurable or whether the item matching module 128 has identified an additional item for the time being displayed). The real time performance tracking 134 can track completed sales by users and identify a difference between selected sales (where an additional item was selected with a base item), non-selected sales, (where an additional item was not selected with a base item), and non-matched sales (where an additional item was not shown with a base item).

The selected and non-selected information can be important to determine the match rate for the website 110. It can be desirable to be match additional items to as many base items in the website 110 as possible. If a new base item is added to the website 110, the new base item can be identified and matched to one or more additional items.

In some examples, the website 110 can include one or more base items that are undesirable to present with an additional item for. For example, spare parts such as a charger for a laptop, which is a standalone item, might be undesirable to match with insurance. By tracking conversion rates, the optimization module 124 can determine to not present an additional item for a base item displayed on a web page to users.

By automating or semi-automating the review process for the item matching module 128, the optimization module 124 can also solve a manual review and update problem that exists in other systems. For example, there can be a semi-automated item matching of all base items from the website, with a person approving matches. For another example, the real time performance tracking module 134 can flag for review a change in the match rates or conversion rates. In some examples, a person can be reviewing the flags. The same process described above for new base items can start over to review all base items in the website 110. The process can occur to change additional items associated with a base item displayed on a web page and change presentation of the additional items based on previous interactions.

III. Data Flow During Interactions with a Website

An integration system, as described above, can be implemented with a website. In some examples, the website can send one or more web pages to a user. In such examples, a web page can include a link to the integration system to facilitate presentation of additional items on the web page.

Figure 2:
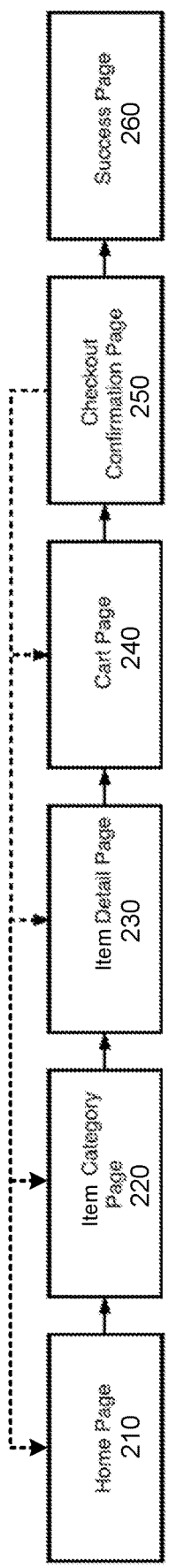
FIG. 2 is a flowchart illustrating various web pages that a user can receive from a website.

FIG. 2 is a flowchart illustrating various web pages that a user can receive from a website. The user can receive a first web page from a website associated with an enterprise (e.g., the website 110). The first web page can be a home page 210. The home page 210 can include various links that can cause the first web page to proceed to a second web page. A first link on the home page 210 can take the user to an item category page 220. The item category page 220 can display one or more base items that are included in an item category. A second link on the home page 210 can take the user to an item detail page 230. The item detail page 230 can display information associated with a base item. In some examples, the item category page 220 can include a link to take the user to the item detail page 230, similar to the second link.

From one or more of the home page 210, the item category page 220, or the item detail page 230, a link can be included that causes a base item to be added to a cart. In some examples, the cart can be stored by the website. The shopping cart can include a list of items that the user has indicated interest in. The cart can be accessed in a variety of ways known to a person of ordinary skill in the art, including a link to a cart page (e.g., a cart page 240). In some examples, the cart can be a pop-up window on a current web page. In other examples, the cart can be included on the current web page.

The user can proceed to the cart page 240, or any other form of the cart. The cart page 240 can further include additional items that the user has not indicated interest in. The additional items can be displayed on the cart page 240 in a template block, as discussed above. The user can indicate whether the user would like one or more of the additional items. A confirmation of one or more items (including one or more base items and zero or more additional items) can occur by proceeding to a checkout confirmation page 250 using a link. A success page 260 can be displayed after the purchase has been concluded and/or confirmed from the checkout confirmation page 250.

In the process described above, the user can step back to a previous page at any time, even iterating through multiple steps over and over, as long as the user does not conclude an interaction (which can take the user to the success page 260). In some examples, an integration plugin (as described above) can store a state of the template block. By storing the template block, the integration plugin can ensure that the template block can be presented in a continuous, uniform manner across different web pages. For example, the same or similar template block can be given to the user when the user is navigating back and forth between web pages.

Figure 3:
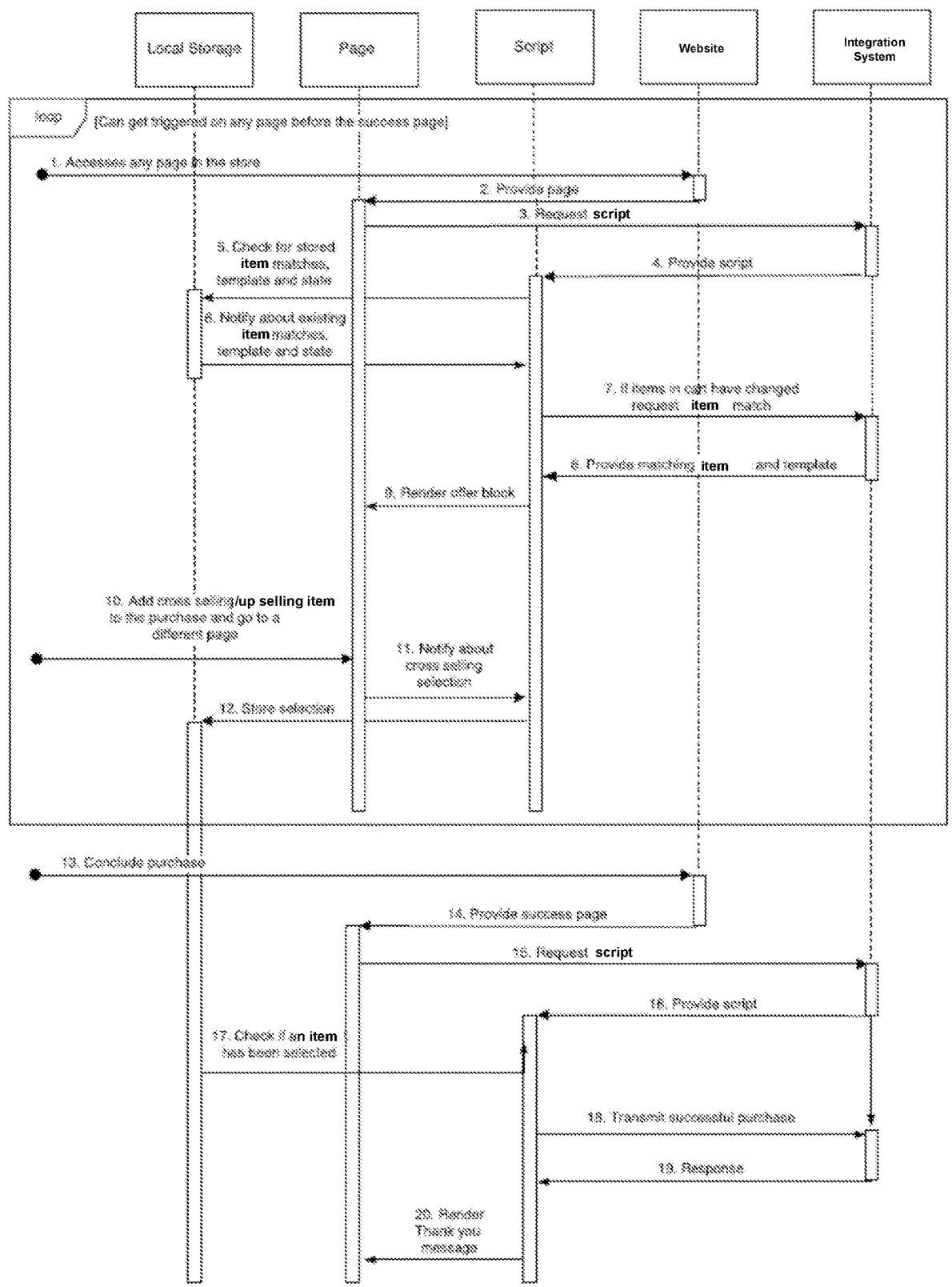
FIG. 3 illustrates an example of a sequence for presenting one or more additional items associated with a base item using an integration plugin.

FIG. 3 illustrates an example of a sequence for presenting one or more additional items associated with a base item using an integration plugin. The sequence can be associated with a user proceeding through the web pages as discussed above. At action 1, the user can navigate to a web page of a website using an electronic device (e.g., computer, cell phone, etc.) connected to the Internet. The web page can be any page discussed above, including an initial web page associated with the website (e.g., home page 210).

At action 2, the electronic device can receive the web page from the website. The web page can include an integration plugin. The integration plugin can be executed on the electronic device. Once executed, the integration plugin can communicate with an integration system (e.g., integration system 120).

At action 3, the integration plugin can request a script from the integration system. The script can be a piece of logic (e.g., JavaScript code) that is loaded by the electronic device.

At action 4, once the script is received from the integration system, the electric device can execute the script using the user's browser or request that this is done by the user's browser. The logic included in the script can be used to manage the connection between the website and the integration system.

In some examples, the script and the integration plugin can be different for each website, based on how item information and user information is stored and presented by each website. In some examples, item information and user information can vary in presentation and format for each website. In addition, a set of instructions, controlled by the script, can be different for each website.

The script can identify a base item on the web page. In some examples, the identified base item can be (1) selected by the user; (2) included in a cart associated with the user; or (3) located on the web page currently being displayed.

At actions 5 and 6, the script can determine whether a local storage of the electric device includes (1) an additional item for the identified base item; and (2) a template block for the additional item. In some examples, the local storage can be a cookie that is saved on the electronic device. In other examples, the local storage can be a memory location on the electronic device, including a storage associated with a web browser installed on the electronic device.

At action 7, if the local storage does not include an additional item, the script can request an identification of the additional item from the integration system, where the additional item would be associated with the identified base item. In some examples, the local storage can be empty because the additional item has not been identified yet for the base item, or the identified base item has changed since an item match occurred. The script can send information associated with the identified base item to the integration system.

At action 8, the integration system can attempt to match the base item with one or more additional items. A determination of whether a match is found can be sent to the script from the integration system. Data associated with matched additional item can also be sent to the script from the integration system.

At action 9, if the local storage 310 includes a match for a base item or a match is received from the integration provider 350, an additional item can be presented on a current page that is loaded on the user's browser.

At action 10, the user can select the additional item (e.g., add the additional item to a cart associated with the user). The user can also select to proceed with or without the additional item.

At action 11, before leaving a current page, the script can receive information associated with a state of selection of the additional item from the current page.

At action 12, when the script receives information associated with the state of selection, the script can store information associated with the selection and the additional item in a local storage on the electronic device.

The actions in the process above can be repeated an infinite number of times until the user concludes an interaction. In each additional page, an additional, or different, integration plugin can be included in the page, which can request an additional script from the integration system. While additional scripts received by the electronic device can be the same as the script, the additional scripts can still be requested on each new page.

At action 13, the user can conclude the interaction. In some examples, when the user concludes the interaction, the website can take the user to a confirmation page (e.g., checkout confirmation page 250) and then to a success page (e.g., success page 260). In other examples, the website can take the user directly to the success page (as shown at action 14).

At action 15, once a user has begun to conclude an interaction (e.g., by proceeding to a confirmation or a success page), a second script can be requested from the integration system. The second script can determine information to send to the integration system to summarize the interaction. In some examples, the second script can be the same as the script. Naming the second script can be to signal that an additional script is received and executed on the electronic device when a new page is received by the electronic device.

At action 16, the second script can be executed from a web page (e.g., the confirmation page or the success page).

At action 17, the second script can determine a current state of the interaction, including whether an additional item has been selected. In some examples, the script can identify whether additional item has been selected by viewing the local storage of the electronic device.

At action 18, the second script can send information associated with the current state of the interaction.

At action 19, the second script can receive a response from the integration system. The response can include information to be displayed on a current web page based on the current state of the interaction. For example, if an additional item has been selected, the information to be displayed on the current web page can include information regarding the additional item.

At action 20, a web page can be displayed to the user on a web page using the response from the integration system.

IV. Methods for Providing an Online Environment

The online environment discussed above can be viewed from a perspective of a client device and from a perspective of an integration system. While methods associated with each perspective can be similar, there are unique steps for both, as will be discussed below.

A. Perspective of a Client Device

Figure 4:
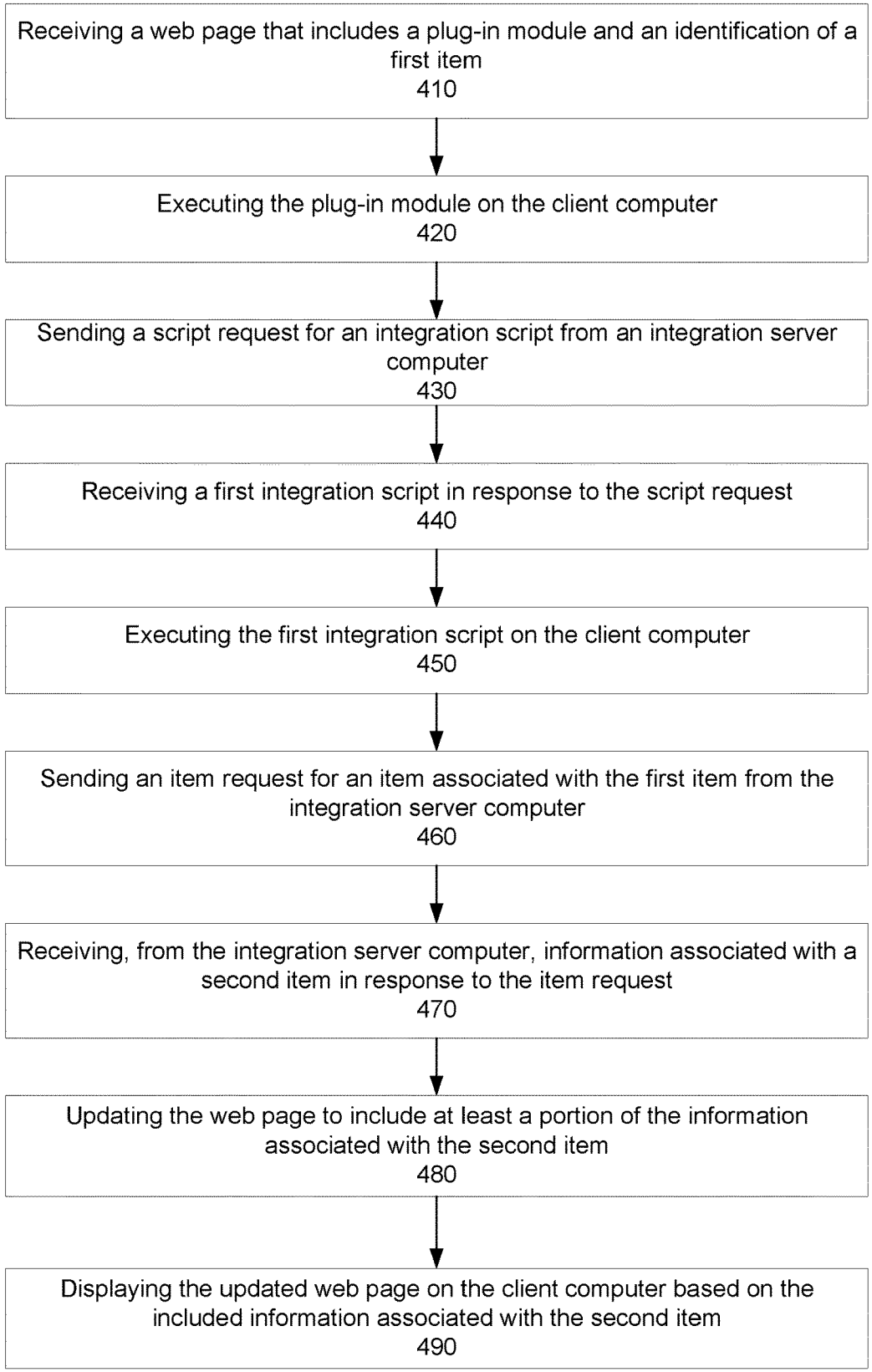
FIG. 4 is a flowchart of a method for providing an online environment on a client computer from the perspective of the client computer.

FIG. 4 is a flowchart of a method 400 for providing an online environment on a client computer from the perspective of the client computer. Method 400 can be performed by a client computer system, which can include an internet browser that is capable of loading and executing an integration plugin.

At 410, the client computer can receive a web page. The web page can include a plug-in module. The web page can also include an identification of a first item. The first item can be one which a user has specified interest in. In other examples, the first item can be a base item as discussed above. The web page can be loaded in the browser of the client computer system using the client computer.

At 420, the client computer can execute the plug-in module. The plug-in module can be used to communicate with an integration server computer. In some examples, the plug-in module can be an invisible component of the web page.

At 430, the plug-in module can be used to request an integration script from an integration server computer. The plug-in module can use the integration script to obtain additional items associated with the first item from the integration server computer.

At 440, the client computer can receive a first integration script in response to the request for the integration script. In response can mean that the first integration script is sent from the integration server computer, and received by the client computer, because of the request for the integration script. In some examples, the first integration script can be sent as soon as the integration server computer receives the request for the integration script.

At 450, the plug-in module can execute the first integration script by loading the first integration script into the user's browser or request that this is done by the browser. The first integration script can determine whether an additional item associated with the first item is included in a local storage of the client computer or the browser. The first integration script can also determine whether the local storage includes a template block, a state of an interaction, or any combination thereof. If these objects exist, the first integration script can proceed to 490, otherwise to 460.

At 460, the first integration script can send an item request for an item associated with the first item. The item request can be sent to the integration server. The integration server can then search for an additional item that is associated with the first item.

At 470, the client computer can receive information associated with a second item. The second item can be an additional item identified by the integration server computer. The second item can be associated with the first item. The information associated with the second item can be received in response to the item request. In some examples, information associated with the second item can be already saved on the integration server computer before the item request is received. In other examples, the integration server computer can search a database for an item associated with the first item when the item request is received. In some examples, the information associated with the second item can include a format to display the second item on a web page, an identification of the second item, a location to place at least a portion of the information associated with the second item on the web page, and a variant of the second item. The variant can include a customization of the second item for the user associated with the client computer.

At 480, the web page can be updated to include at least a portion of information associated with the second item. In some examples, before the web page is updated, the first integration script ca determine that the web page is one of one or more web pages that are included in the information associated with the second item. If the web page is not one of the one or more web pages, the web page might not be updated.

At 490, the updated web page can be presented in the browser of the client computer. In some examples, information associated with the web page, including the format, the second item, the location, the variant, or any combination thereof can be stored into a local storage of the browser when a user leaves a current page. The information can also be stored into a local storage of the client computer.

In some examples, the method 400 can further include the client computer receiving a selection from a user associated with the second item. For example, the user can click on the second item. In response to the selection, a web page request can be sent for a second page (e.g., a success page) from the website.

In some examples, the client computer can receive the second page from the website. The second page can include a second plug-in module. After the second plug-in module is executed on the client computer, the second plug-in module can send a second request (or another request) for a second integration script to the integration server computer. In some examples, the second integration script can be the same as the first integration script. The second integration script can be received by the client computer and executed on the client computer. In some examples, the second plug-in module and the second integration script can be invisible components of the second web page. The second plug-in module and the second integration script can be copies of the first plug-in module and the first integration script respectively. The request for the second integration script can be required because a different page is loaded and the first integration script has completed when the web page changed.

In some examples, the second integration script can send information associated with the selection to the integration server computer. In response, the client computer can receive information to display on the success page from the integration server computer.

In some examples, the second web page can be updated to include at least a portion if the information to display on the second web page. The client computer can then display the updated second web page.

B. Perspective of an Integration Server

Figure 5:
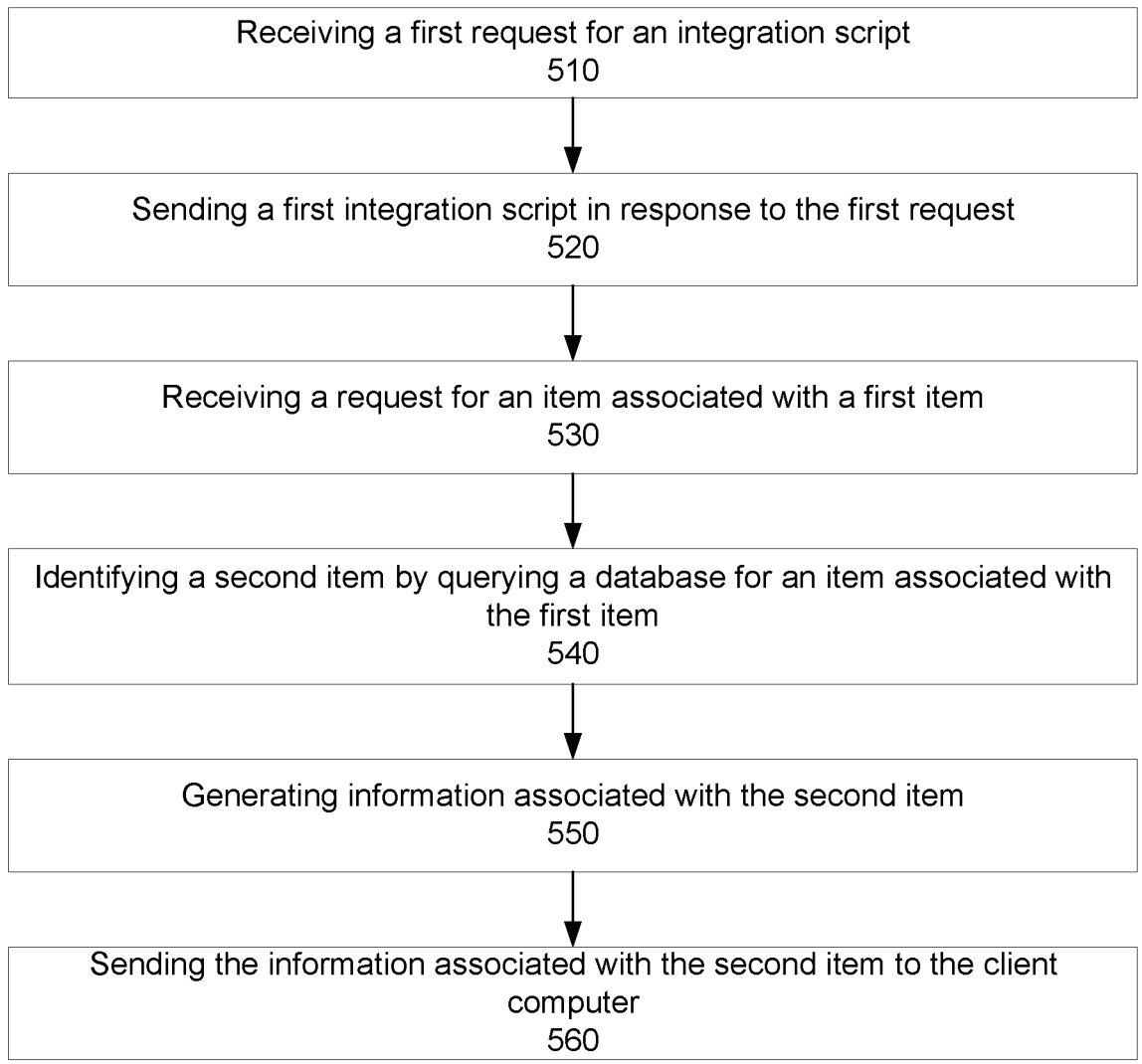
FIG. 5 is a flowchart of a method for providing an online environment on a client computer from the perspective of a server computer system.

FIG. 5 is a flowchart of a method 500 for providing an online environment on a client computer from the perspective of a server computer system (e.g., the integration system 120). Method 500 can be performed by the server computer system.

At 510, the server computer system can receive a first script request for an integration script. The first script request can be sent from a client computer using a plug-in module. At 520, the server computer system can send a first integration script in response to the first script request. The first integration script can be sent to the client computer.

At 530, the server computer system can receive an item request for an item associated with a first item. The first item can be located on a web page to be displayed by the client computer. The item request for the item can be sent by the client computer using the first integration script.

At 540, the server computer system can identify a second item by querying a database for an item associated with the first item. The database can include a plurality of items. The second item can be associated with the first item.

In some examples, the server computer system can determine a format to display at least a portion of the information associated with the second item. In such examples, the information associated with the second item can include the format and a location to place the information associated with the second item on the web page. The server computer system can also determine one or more pages for the information associated with the second item to be displayed. In such examples, the information associated with the second item can include an identification of the one or more pages. The server computer system can also determine a variant of the second item based on a user associated with the client computer. The information associated with the second item can further include the variant.

At 550, the server computer system can generate information associated with the second item. At 560, the server computer system can send the information associated with the second item to the client computer.

In some examples, the method 500 can further include the server computer system receiving a second script request (or another script request) for an integration script from the client computer. The server computer system can send a second integration script to the client computer in response to the second script request. In some examples, the second integration script can be the same as the first integration script.

In some examples, the method 500 can further include the server computer system receiving a success message from the client computer. The success message can indicate a selection of the second item. In response, the server computer system can send information associated with the selection of the second item to the client computer.

V. Computer System

Any of the computer systems mentioned herein may utilize any suitable number of subsystems. Examples of such subsystems are shown in FIG. 6 in computer system 10. In some embodiments, a computer system includes a single computer apparatus, where the subsystems can be the components of the computer apparatus. In other embodiments, a computer system can include multiple computer apparatuses, each being a subsystem, with internal components.

The subsystems shown in FIG. 6 are interconnected via a system bus 75. Additional subsystems such as a printer 74, keyboard 78, storage device(s) 79, monitor 76, which is coupled to display adapter 82, and others are shown. Peripherals and input/output (I/O) devices, which couple to I/O controller 71, can be connected to the computer system by any number of means known in the art such as input/output (I/O) port 77 (e.g., USB, FireWire®). For example, I/O port 77 or external interface 81 (e.g. Ethernet, Wi-Fi, etc.) can be used to connect computer system 10 to a wide area network such as the Internet, a mouse input device, or a scanner. The interconnection via system bus 75 allows the central processor 73 to communicate with each subsystem and to control the execution of instructions from system memory 72 or the storage device(s) 79 (e.g., a fixed disk, such as a hard drive or optical disk), as well as the exchange of information between subsystems. The system memory 72 and/or the storage device(s) 79 may embody a computer readable medium. Any of the data mentioned herein can be output from one component to another component and can be output to the user.

A computer system can include a plurality of the same components or subsystems, e.g., connected together by external interface 81 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications, and descriptions mentioned herein are incorporated by reference in their entirety for all purposes. None is admitted to be prior art.

What is claimed is:

1. A method of providing an online environment on a client computer, the method comprising performing by a server computer system:
   receiving, from the client computer, a first request for an integration script via a plug-in module executing on a web page of a website, the web page including an identification of a first item;
   sending, to the client computer, a first integration script in response to the first request, the first integration script configured to check a local storage of the client computer, wherein the first integration script is executable via the plug-in module to determine that an item associated with the first item is not included in the local storage;
   receiving, from the client computer using the first integration script, a request for an item associated with a first item in response to a determination by the client computer that the item associated with the first item is not included in the local storage,
   identifying a second item by querying a database for an item associated with the first item, wherein the database includes a plurality of items, and wherein the second item is associated with the first item;
   generating information associated with the second item, wherein the information includes a second identification of the second item and an element identifier of one or more web hooks located in particular portions of the web page; and
   sending the information associated with the second item to the client computer, wherein the web page includes the one or more web hooks located in the particular portions of the web page.

2. The method of claim 1, wherein the element identifier is a first element identifier, and wherein the information includes a second element identifier for one or more page elements, the first element identifier and the second element identifier indicating multiple stages of a template block for displaying the second item.

3. The method of claim 2, wherein the one or more page elements lead to another web page of the website after interaction by a user, thereby causing the second item to be displayed in multiple web pages of the website.

4. The method of claim 2, wherein the one or more page elements determine an end of an interaction of a user with the web page.

5. The method of claim 1, further comprising:
   determining a format to display at least a portion of the information associated with the second item, wherein the information associated with the second item further includes the format.

6. The method of claim 5, further comprising:
   determining one or more web pages for at least the portion of the information associated with the second item to be displayed, wherein the information associated with the second item identifies the one or more web pages.

7. The method of claim 5, wherein the information associated with the second item further includes a location to place the information associated with the second item on the web page, the location associated with one of the one or more web hooks located in the particular portions of the web page.

8. The method of claim 1, further comprising:
   determining a variant of the second item based on a user associated with the client computer, wherein the information associated with the second item further includes the variant.

9. The method of claim 1, further comprising:
   receiving, from the client computer, a second script request for the integration script;
   sending, to the client computer, the integration script in response to the second script request;
   receiving, from the client computer using the integration script, a success message, wherein the success message indicates a selection of the second item; and
   sending, to the client computer, information associated with the selection of the second item.

10. The method of claim 9, wherein the information associated with the selection of the second item includes a confirmation regarding the second item.

11. A method of providing an online environment on a client computer, the method comprising performing by the client computer:
   receiving, from a web site, a web page that includes a first item;
   sending, to an integration server computer via a plug-in module executing on the web page, a script request for an integration script;
   receiving, from the integration server computer, a first integration script in response to the script request;
   executing the first integration script on the client computer;
   determining, using the first integration script, that a local storage of the client computer does not include one or more items associated with the first item;
   sending, to the integration server computer using the first integration script, an item request, the sending of the item request being in response to the determining that the local storage does not include the one or more items associated with the first item;
   receiving, from the integration server computer, information associated with a second item in response to the item request, wherein the second item is associated with the first item;

updating, using the integration script, the web page to include at least a portion of the information associated with the second item; and displaying the updated web page on the client computer.

12. The method of claim 11, wherein the web page is updated to include the portion of the information associated with the second item at multiple stages of interaction between a user and the website.

13. The method of claim 12, wherein the information associated with the second item includes a template block, wherein the web page is updated by updating the template block in accordance with the multiple stages of interaction between the user and the website.

14. The method of claim 13, wherein the multiple stages of interaction between the user and the website include a selection of the second item and a purchase of the second item.

15. The method of claim 13, further comprising:
storing different states of the template block reflecting different actions taken by the user.

16. The method of claim 15, further comprising:
using a stored state of the template block for displaying the portion of the information associated with the second item across different web pages.

17. The method of claim 11, further comprising:
determining, using the first integration script, that an item associated with the first item has not been received from the integration server computer, wherein the determination occurs before the item request.

18. The method of claim 11, further comprising:
determining, using the first integration script, that the web page is one of one or more web pages, wherein an identification of the one or more web pages is included in the information associated with the second item, and wherein the determination occurs before the web page is updated.

19. The method of claim 11, further comprising:
receiving a selection associated with the second item;
sending a web page request for a second web page from the website after the selection is received;
receiving the second web page from the web site;
sending, to the integration server computer, another script request;
receiving a second integration script from the integration server computer;
executing the second integration script on the client computer;
sending, using the second integration script, information associated with the selection to the integration server computer;
receiving information to display on the second web page from the integration server computer in response to sending the information associated with the selection;
updating, using the second integration script, the second web page to include at least a portion of the information to display on the second web page; and
displaying the updated second web page on the client computer.

20. The method of claim 19, wherein the plug-in module is an invisible component of the web page, and wherein the other script request is sent using a second plug-in module that is an invisible component of the second web page.

21. The method of claim 11, wherein the information associated with the second item includes a format to display the second item on the web page, an identification of the second item, and a location to place at least a portion of the information associated with the second item on the web page.

22. The method of claim 21, wherein the information associated with the second item further includes a variant of the second item, and wherein the variant includes a customization of the second item for a user associated with the client computer.

* * * * *